Patented Feb. 24, 1948

2,436,708

UNITED STATES PATENT OFFICE 2,436,708

CERAMIC MIXTURES

Louis Bonnet, Villasavary, and Maurice Marty, Neuilly-sur-Seine, France

No Drawing. Application August 18, 1936, Serial No. 96,674. In France December 12, 1935

Section 3, Public Law 690, August 8, 1946
Patent expires December 12, 1955

3 Claims. (Cl. 106—46)

The present invention has for object a compound and a method for the production of extra-aluminous products, in connection namely with the earth-alkaline borates, and allowing of obtaining between 1300° and 1500° a final product having high qualities of toughness, hardness, and whose electrical resistance very high in the cold is maintained at about 800° C.

They are suitable for the manufacture of spark plugs, high tension insulators and abrasive materials.

Fluxes or binders which may be used are the borates, phosphates and silicates of lime, baryta, strontia, magnesia, zinc, taken either alone or in mixtures. A small percentage of metal oxides such as $Fe_2O_3$ may be allowed.

The proportion of flux added to the corundum may vary from 1 to 30 per cent of the total weight.

The following are some examples of mixtures which will give good results:

*Formula 1*

| | Parts by weight |
|---|---|
| Crystallized corundum or alumina | 90 |
| $B_2O_3$ | 5.6 |
| CaO | 4.4 |
| $SiO_2$ | 0 to 5 |
| $Fe_2O_3$ | 0 to 2 |

*Formula 2*

| | Parts by weight |
|---|---|
| Crystallized corundum or alumina | 83 |
| Phosphate of lime | 5 |
| Silicate of magnesia or kaolin | 5 |
| $B_2O_3$ | 4.5 |
| MgO | 2.5 |

*Formula 3*

| | Parts by weight |
|---|---|
| Crystallized corundum or alumina | 86 |
| $B_2O_3$ | 8.7 |
| MgO | 5 |
| Silicate of magnesia or kaolin | 3 to 10 |

Should these mixtures be insufficiently plastic, then a small percentage of gum or clay may be added thereto in order to increase their plasticity.

The mixtures thereafter are molded or pressed.

The baking temperature may be raised up to the degree of electric imperviousness (about 1300 to 1600° C.).

A great importance is to be attached to the use of borates, as claimed, since said substances not only are powerful fluxes, agglutinators and mineralizers but also possess the valuable property that, in combination with alumina, silica, etc., and a weak solution of aluminum chloride or HCl, they will lead to perfectly fluid mixtures adapted to be cast in non absorbing molds.

In order to obtain a fluid pulp suitable for casting it is advantageous to use an electrolyte containing aluminum chloride ($Al_2Cl_6$) as a 1 to 20% solution.

For instance, to 100 gr. of mixture No. 2 there may be added 25 ccm. of a 5 to 10% $Al_2Cl_6$ solution; by stirring there is obtained a fluid paste from which the bubbles can be expelled with the aid of vacuum.

Such a pulp possesses a valuable property in that it will remain fluid for a comparatively long time in the cold.

It is only necessary to heat the same to a temperature not much higher than 100° C. to cause it to solidify immediately.

It is thus possible to cast it in metal molds which can be used over again indefinitely.

Casting ceramic products up to the present was only possible in absorbing plaster or like molds which had to be renewed frequently.

Products obtained by pouring according to this invention have a firm body which permits working in the still unbaked state. They are not sensitive to sudden drying and when baked they possess the same properties that similar mixtures have when shaped by pressing.

The aluminum chloride solution is also useful to agglomerate pure crystallized corundum ground into powder (instead of agglomerating the above formulated mixtures); the molded or cast products then have to be heated to a temperature between 1700 and 1800° C.

Instead of aluminum chloride other chlorine-containing electrolyte (e. g. an HCl solution) may be used that will allow the reaction to be carried out and that is consistent with the above mentioned formulae.

The crystallized alumina may be substituted by ordinary alumina previously submitted to high-temperature mineralization in the presence of mineralizing constituents such as those mentioned in the formulae.

We claim:

1. A ceramic mixture comprising 90 parts by weight of crystallized alumina, 5.6 parts of boron oxide, 4.4 parts of lime, 0 to 5 parts of silica, 0 to 2 parts of iron oxide.

2. A ceramic mixture comprising 83 parts by weight of crystallized alumina, 4.8 parts of boron oxide, 2.3 parts of magnesia.

3. A ceramic mixture comprising 86 parts by weight of crystallized alumina, 8.7 parts of boron oxide, 5 parts of magnesia, 3 to 10 parts of silicate of magnesia.

LOUIS BONNET.
MAURICE MARTY.

REFERENCES CITED

The following references are of record in the file of this patent:

UNITED STATES PATENTS

| Number | Name | Date |
|---|---|---|
| 71,229 | Seymour | Nov. 19, 1867 |
| 1,107,011 | Allen | Aug. 11, 1914 |
| 1,394,442 | Purdy et al. | Oct. 18, 1924 |
| 1,769,297 | Lambie et al. | July 1, 1930 |
| 1,788,123 | Phelps | Jan. 6, 1931 |
| 1,827,838 | Curtis | Oct. 20, 1931 |
| 1,877,531 | Reichman | Sept. 13, 1932 |
| 1,897,183 | White | Feb. 14, 1933 |
| 2,007,053 | Howe | July 2, 1935 |
| 2,019,208 | Baumann | Oct. 29, 1935 |
| 2,059,280 | Ruben | Nov. 3, 1936 |
| 2,121,606 | McCulloch | June 21, 1938 |